US012688306B2

(12) United States Patent
Kasper et al.

(10) Patent No.: US 12,688,306 B2
(45) Date of Patent: Jul. 21, 2026

(54) DETECTING PRIVILEGE ESCALATION ACHIEVED BY MANIPULATING SETTINGS

(71) Applicant: International Business Machines Corporation, Armonk, NY (US)

(72) Inventors: Michael Page Kasper, Wappingers Falls, NY (US); Bryan Childs, Poughkeepisie, NY (US); Andrew C. M. Hicks, Highland, NY (US); Diane Marie Stamboni, Poughkeepsie, NY (US); Joshua David Steen, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 22 days.

(21) Appl. No.: 18/882,069

(22) Filed: Sep. 11, 2024

(65) Prior Publication Data

US 2026/0073055 A1     Mar. 12, 2026

(51) Int. Cl.
*G06F 21/57*        (2013.01)
*G06F 21/54*        (2013.01)

(52) U.S. Cl.
CPC ............ *G06F 21/577* (2013.01); *G06F 21/54* (2013.01)

(58) Field of Classification Search
None
See application file for complete search history.

(56) References Cited

U.S. PATENT DOCUMENTS 11,641,361 B2     5/2023  Innes et al.
2013/0132690 A1*  5/2013  Epstein ................. G06F 12/145
                                                     711/159

2013/0212682 A1*  8/2013  McClure ............... G06F 21/577
                                                     726/25
2021/0124824 A1   4/2021  Xu et al.
2022/0050897 A1   2/2022  Gaddam et al.

OTHER PUBLICATIONS

PCI Security Standards Council, PCI DSS Quick Reference Guide: Understanding the Payment Card Industry Data Security Standard version 3.2.1., Jul. 2018.
Saudi Arabian Monetary Authority, Cyber Security Framework, Version 1.0, May 2017.
Carstens, Security Attestation Process, ip.com, Aug. 10, 2010.
Authors et al., A method to detect and restrict access to resources post 2FactorAuth password compromise and reset executed by a potential impersonated user, ip.com, Dec. 17, 2019.
Authors et al., System and Method for Secure Development, ip.com, Oct. 30, 2023.
JPMorgan Chase & Co. Minimum Control Requirements, 2023.
OWASP, Open Web Application Security Projrect, Testing Guide 4.0, 2013.

* cited by examiner

*Primary Examiner* — Brandon Hoffman
(74) *Attorney, Agent, or Firm* — Teddi Maranzano, Esq.; Matthew M. Hulihan, Esq.; Heslin Rothenberg Farley & Mesiti P.C.

(57)        ABSTRACT

Embodiments herein include generating a safe copy of a first control block for an operating system, recording the safe copy in memory, initiating a test of an authorized service associated with the operating system, identifying a vulnerability for the authorized service that includes comparing a state of the first control block after the test of the authorized service with the safe copy recorded in memory, and initiating an action to alleviate the identified vulnerability.

20 Claims, 5 Drawing Sheets

500

DETECTING PRIVILEGE ESCALATION ACHIEVED BY MANIPULATING SETTINGS

BACKGROUND

The present invention relates to computing systems, and more specifically, to computer security.

SUMMARY

One embodiment herein is a method that includes generating a safe copy of a first control block for an operating system, recording the safe copy in memory, initiating a test of an authorized service associated with the operating system, identifying a vulnerability for the authorized service that includes comparing a state of the first control block after the test of the authorized service with the safe copy recorded in memory, and initiating an action to alleviate the identified vulnerability.

One embodiment herein is a non-transitory computer program product that includes one or more non-transitory computer readable media containing, in any combination, computer program code that, when executed by operation of any combination of one or more processors, performs operations. The operations includes generating a safe copy of a first control block for an operating system, recording the safe copy in memory, initiating a test of an authorized service associated with the operating system, identifying a vulnerability for the authorized service that includes comparing a state of the first control block after the test of the authorized service with the safe copy recorded in memory, and initiating an action to alleviate the identified vulnerability.

One embodiment herein is a system that includes one or more processors and one or more memories storing a program, which, when executed on any combination of the one or more processors, performs operations. The operations includes generating a safe copy of a first control block for an operating system, recording the safe copy in memory, initiating a test of an authorized service associated with the operating system, identifying a vulnerability for the authorized service that includes comparing a state of the first control block after the test of the authorized service with the safe copy recorded in memory, and initiating an action to alleviate the identified vulnerability.

DETAILED DESCRIPTION

Figure 1:
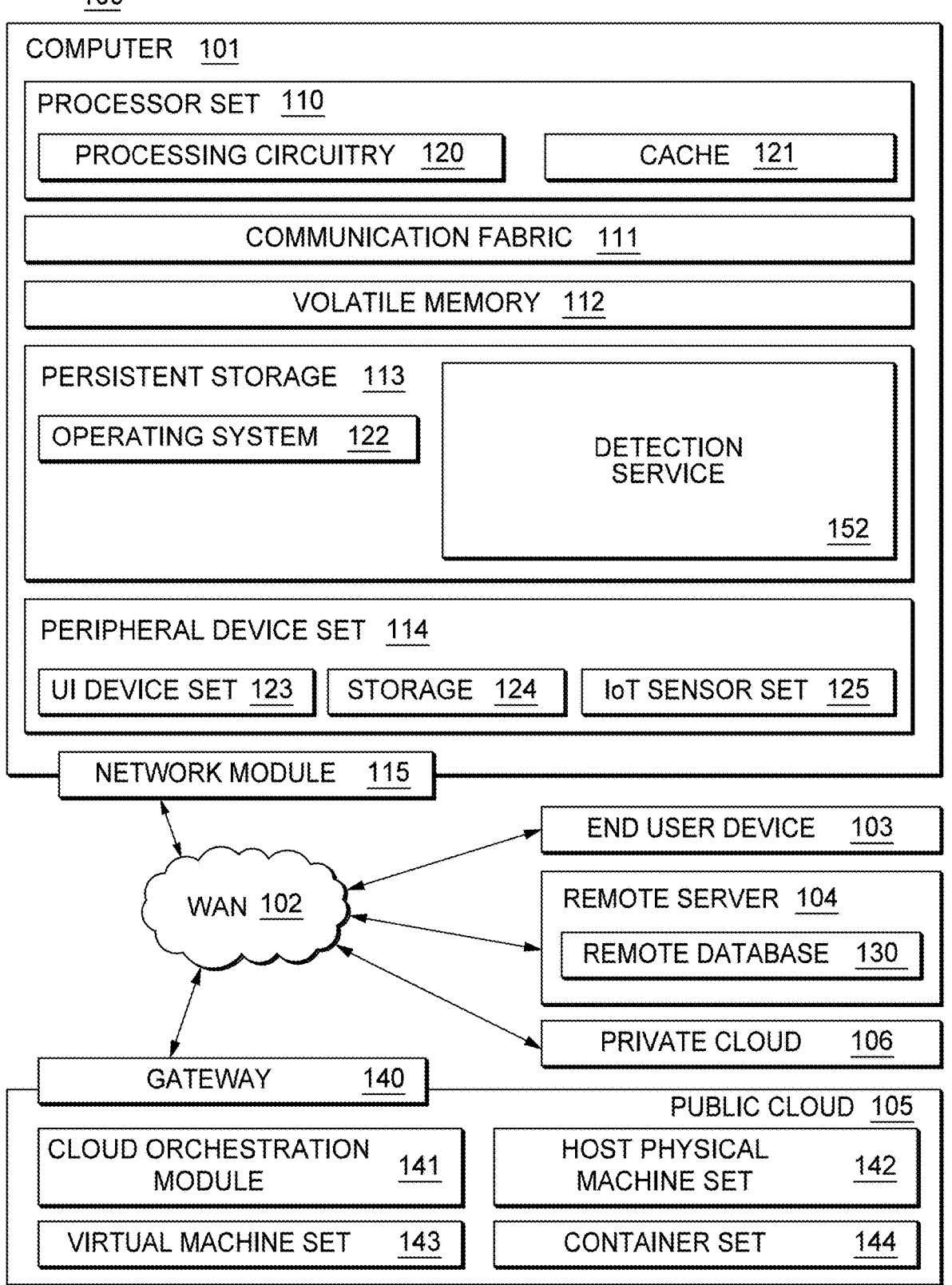
FIG. 1 illustrates a computing environment for detecting privilege escalation, according to one embodiment.

As part of cyber security testing, a testing program can look for security vulnerabilities in a variety of ways. For example, during dynamic security testing of authorized operating system (OS) services, a testing program can check for signs of a buffer overflow, for example identifying that storage has been modified that should not have been able to be modified. As another example, a testing program can conduct a check indicating a read, write, or branch to an address where a given service (e.g., an otherwise authorized service) should not have been reading, writing, or branching. The testing program can further check the execution state when it gains control, to determine whether the execution state is running in supervisor state, system key, or with authorization. As one example, an authorized scanner (e.g., a z/OS Authorized Code Scanner (zACS)) can perform these checks for authorized services (e.g., supervisor call (SVC) services, program call (PC) services, or authorization code 1 (AC(1)) services).

In a fixed block control architecture (e.g., z/OS), security settings and privileges are typically defined by system control blocks (e.g., accessor environment element (ACEE) blocks, job step control blocks (JSCBs) and any other suitable control blocks). This means that a security testing program should check for modifications to security related control blocks, or it could miss privilege escalation vulnerabilities.

One or more embodiments discussed below provide techniques to check for privilege escalation vulnerabilities (e.g., in control blocks). For example, an OS can protect the storage integrity of multiple users by using a control field (e.g., referred to as a storage protect key in z/OS). When a request is made to modify the contents of a central storage location, the field (e.g., key) associated with the request is compared to the storage protect field (e.g., the storage protect key). If the keys match, the request is satisfied. If the key associated with the request does not match the storage key, the system rejects the request and issues a program exception interruption. (For z/OS, key zero can access any other key). In an embodiment, an OS can divide the storage protect keys between system keys and user keys.

In an embodiment, system control blocks can relate to system keys for the OS, such that only authorized users should be able to modify the system control blocks. This means that dynamic testing should not modify system control blocks, unless the testing is associated with an authorized user. Before dynamic testing of an authorized service, a security testing program can make a copy of relevant security related control blocks and save the copy in a protected location that is not easy to find or access. After the security testing program runs a dynamic test of the authorized service, it can compare each of those control blocks to the safe copy to detect any changes that might have occurred. If the security testing program identifies any relevant changes, it can generate an alert or report can be indicating the potential security vulnerability and the details of the test that caused it.

Further, to continue testing in a predictable environment, the security testing program can reset the control blocks back to the state they were in before the test, allowing the next test to be run. In this way the dynamic testing can go through all the expected variations and each test case can be analyzed to determine if it reveals any privilege escalations in the target program. In an embodiment, this also allows the problem to be recreated more easily by recording the details of the specific test, along with any relevant details to help determine the problem.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as such as a detection service 152 for detecting privilege escalation. In addition to block 152, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 152, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 152 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 152 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Figure 2:
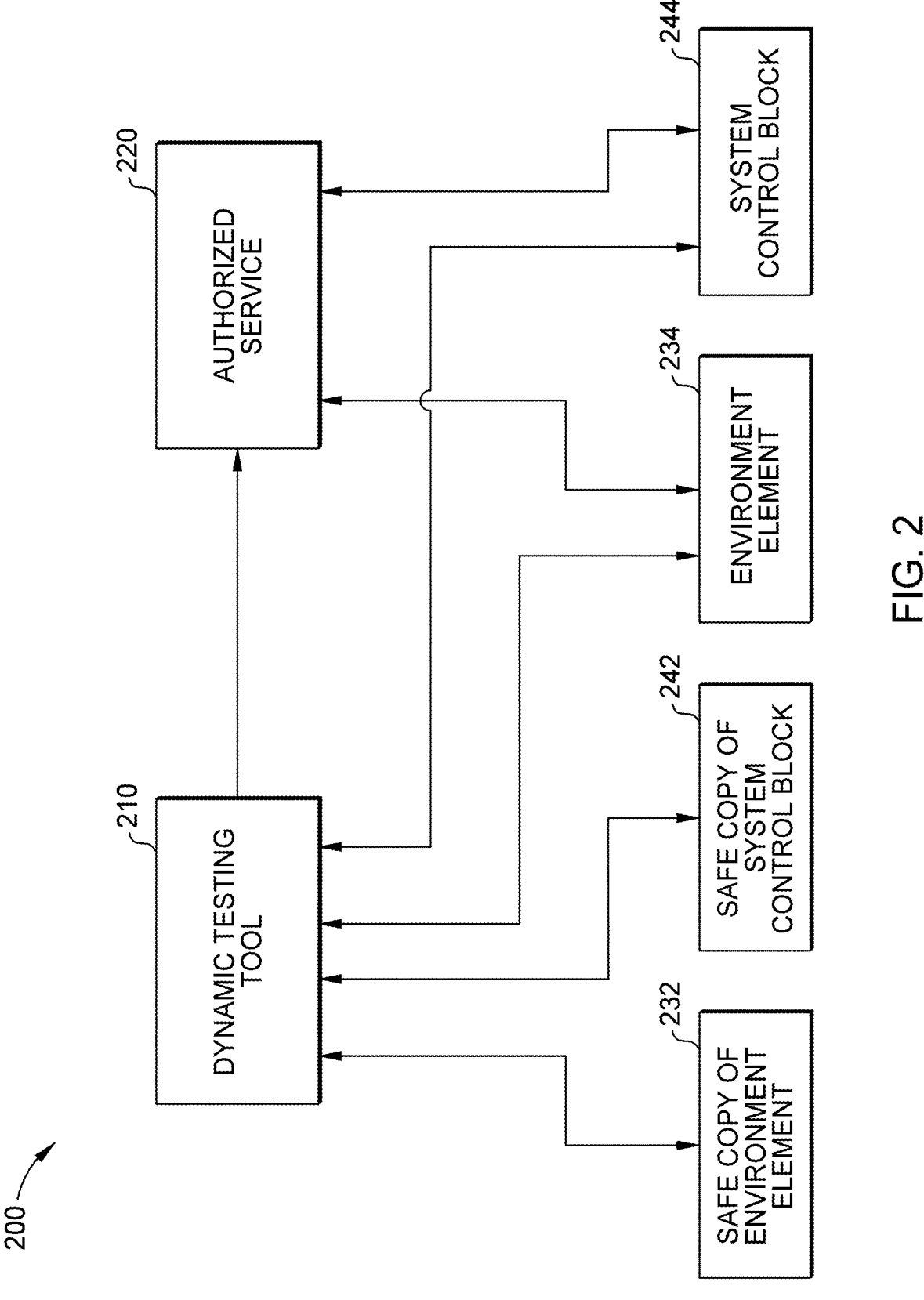
FIG. 2 illustrates a block diagram for detecting privilege escalation, according to one embodiment.

FIG. 2 illustrates a block diagram 200 for detecting privilege escalation, according to one embodiment. In an embodiment, a dynamic testing tool 210 (e.g., the detection service 152 illustrated in FIG. 1, or any other suitable software service) makes a safe copy of an environment element 232. For example, the dynamic testing tool 210 can operate in z/OS or a similar OS, and can save a safe copy of the ACEE containing system authorization facility (SAF) related information. The safe copy of the environment element 232 can include a number of fields, including ACEESPEC which gives the user SPECIAL authority to modify security profiles, ACEEPRIV which gives the user PRIVILEGED access to bypass auditing as well as bypass security, and the ACEEOPER which gives the user OPERA-TIONS access to perform system operator or administrative functions for z/OS.

Further, the dynamic testing tool 210 can make a safe copy of the system control block 242. Continuing with the z/OS example, the dynamic testing tool 210 can save a safe copy of the JSCB, which contains information about the job step. This safe copy can include fields associated with the system control block. For example, fields in the JSCB can include a JSCBAUTH field which sets authorized program facility (APF) authorization for the task, and JSCBPASS which specifies that OPEN processing should bypass protection for data sets. These are merely examples, and the dynamic testing tool 210 can save a safe copy of any suitable element or block, including any suitable fields or other data.

In an embodiment, the dynamic testing tool 210 then initiates a test run for the authorized service 220, which operates using the environment element 234 and the system control block 244. In an embodiment, the dynamic testing tool 210 passes numerous parameters for the authorized service, in order to force program checks. After the authorized service 220 completes its function(s), the dynamic testing tool 210 compares the safe copy of the environment element 232 to the environment element 234, and compares the safe copy of the system control block 242 to the system control block 244. If the dynamic testing tool identifies any changes in the comparisons, it takes a suitable action (e.g., generates an alert or report, or takes any other suitable action), and restores the environment element 234 and system control block 244 back to their baseline state using the safe copy of the environment element 232 and the safe copy of the system control block 242.

In an embodiment, the dynamic testing tool 210 saves the safe copy of the environment element 232 and the safe copy of the system control block 242 in a location unlikely to be found or modified (e.g., by the authorized service 220), and marks the safe copies as protected. For example, the dynamic testing tool 210 can save the safe copy of the environment element 232 and the safe copy of the system control block 242 in the address space of the dynamic testing tool 210, in a data space, or in any other suitable location. It can also save them using a system protection key that cannot be accessed by unauthorized users.

Further, in an embodiment the dynamic testing tool 210 itself may not run as an authorized program, so an additional service or services can be available to the dynamic testing tool 210 (e.g., within the test infrastructure) to make copies of control blocks and do the checking after the test runs (e.g., for the authorized service 220). As one example, the dynamic testing tool 210 can call the additional service(s) before and after the test, to create the safe copy of the environment element 232 and the safe copy of the system control block 242 and compare them to the environment element 234 and system control block 244.

Alternatively, or in addition, the dynamic testing tool 210 does not save the actual binary string representing the safe copy of the environment element 232, the safe copy of the system control block 242, or both. For example, the dynamic testing tool 210 can store a transformed version of one, or both, control blocks (e.g., an XOR of the control block values). This can limit the ability to search for the safe copies of the control blocks in storage.

Figure 3:
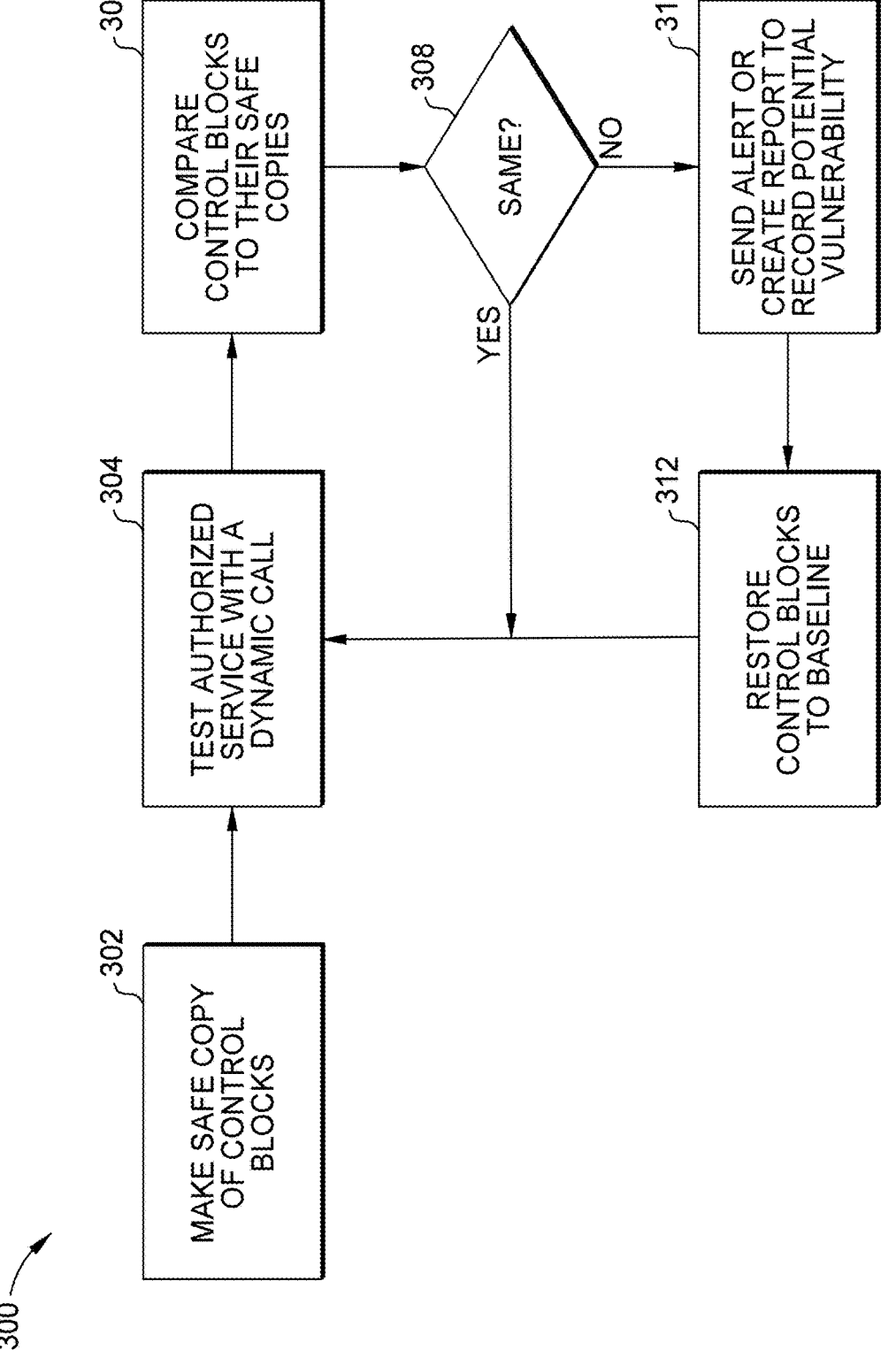
FIG. 3 illustrates a flowchart for detecting privilege escalation, according to one embodiment.

FIG. 3 illustrates a flowchart 300 for detecting privilege escalation, according to one embodiment. At block 302, a detection service (e.g., the detection service 152 illustrated in FIG. 1) makes a safe copy of the control blocks. For example, as discussed above in relation to FIG. 2, the detection service can make a safe copy of an environment element 232, a safe copy of a system control block 242, or a safe copy of any other suitable control block. In an embodiment, the detection service saves the safe copies of the control blocks in a location unlikely to be found or modified (e.g., an address space associated with the detection service, or any other suitable location).

At block 304, the detection service tests an authorized service with a dynamic call. For example, using the example illustrated in FIG. 2, the detection service can initiate a dynamic call to the authorized service 220 for a test run.

At block 306, after the test run for the authorized service, the detection service compares the control blocks to their safe copies. For example, again using the example illustrated in FIG. 2, the detection service can compare the safe copy of the environment element 232 to the environment element 234, and the safe copy of the system control block 242 to the system control block 244.

At block 308, the detection service determines whether the safe copies of the control blocks are the same as the current control blocks (e.g., after the test run for the authorized service). If so, the flow returns to block 304 and the detection service initiates a test for another authorized service using a dynamic call, or a different test for the same authorized service. If not, the flow proceeds to block 310.

At block 310, the detection service sends an alert or creates a report to record a potential vulnerability. For example, the detection service can send an alert to another aspect of the OS, another software service, a local administration system, a remote administration system, or any other suitable destination, or can generate a report indicating the potential vulnerability (e.g., memorializing operational information for the potential vulnerability). These alerts or reports can be used by an automated system (e.g., a diagnostic software service) or a human administrator to identify the potential vulnerability, cure the potential vulnerability, or take any other suitable action. In an embodiment, these are merely examples and the detection service can take any suitable action or actions.

At block 312, the detection service restores the control blocks to baseline. For example, the detection service replaces the environment element 234 with the safe copy of the environment element 232, and replaces the system control block 244 with the safe copy of the system control block 242. The flow then returns to block 304, and the detection service initiates another test for either the same or another authorized service using a dynamic call.

Figure 4:
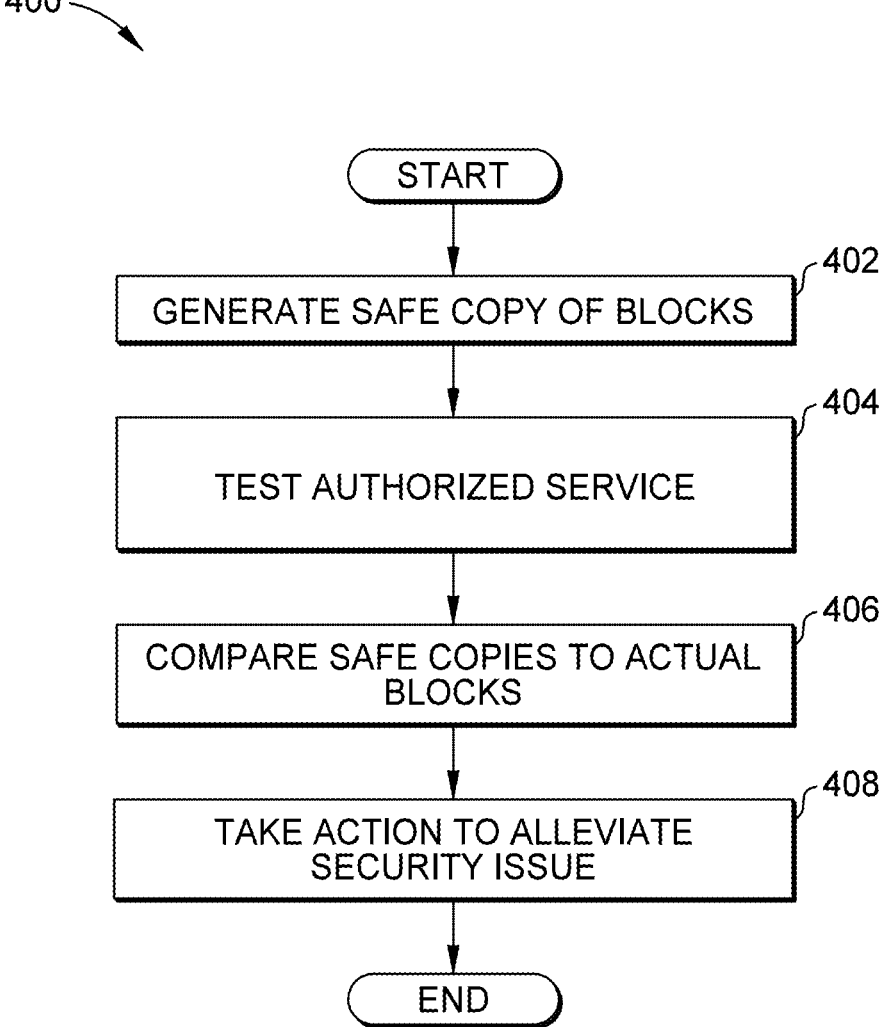
FIG. 4 illustrates a further flowchart for detecting privilege escalation, according to one embodiment.

FIG. 4 illustrates a further flowchart 400 for detecting privilege escalation, according to one embodiment. At block 402, a detection service (e.g., the detection service 152 illustrated in FIG. 1) generates safe copies of control blocks. For example, as discussed above in relation to FIGS. 2-3, the detection service can make a safe copy of an environment element 232, a safe copy of a system control block 242, or a safe copy of any other suitable control block. In an embodiment, the detection service saves the safe copies of the control blocks in a location unlikely to be found or modified (e.g., an address space associated with the detection service, or any other suitable location).

At block 404, the detection service tests the authorized service. For example, using the example illustrated in FIG. 2, the detection service can initiate a dynamic call to the authorized service 220 for a test run.

At block 406, the detection service compares safe copies to actual blocks. For example, again using the example illustrated in FIG. 2, the detection service can compare the safe copy of the environment element 232 to the environment element 234, and the safe copy of the system control block 242 to the system control block 244.

At block 408, the detection service takes action to alleviate the security issue. For example, as discussed above in relation to FIG. 3, the detection service can send an alert or create a report to record a potential vulnerability. These alerts or reports can be used by an automated system (e.g., a diagnostic software service) or a human administrator to identify the potential vulnerability, cure the potential vulnerability, or take any other suitable action. In an embodiment, these are merely examples and the detection service can take any suitable action or actions. Further, the detection service can restore the control blocks to baseline. For example, returning to the example of FIG. 2, the detection service can replace the environment element 234 with the safe copy of the environment element 232, and can replace the system control block 244 with the safe copy of the system control block 242.

Figure 5:
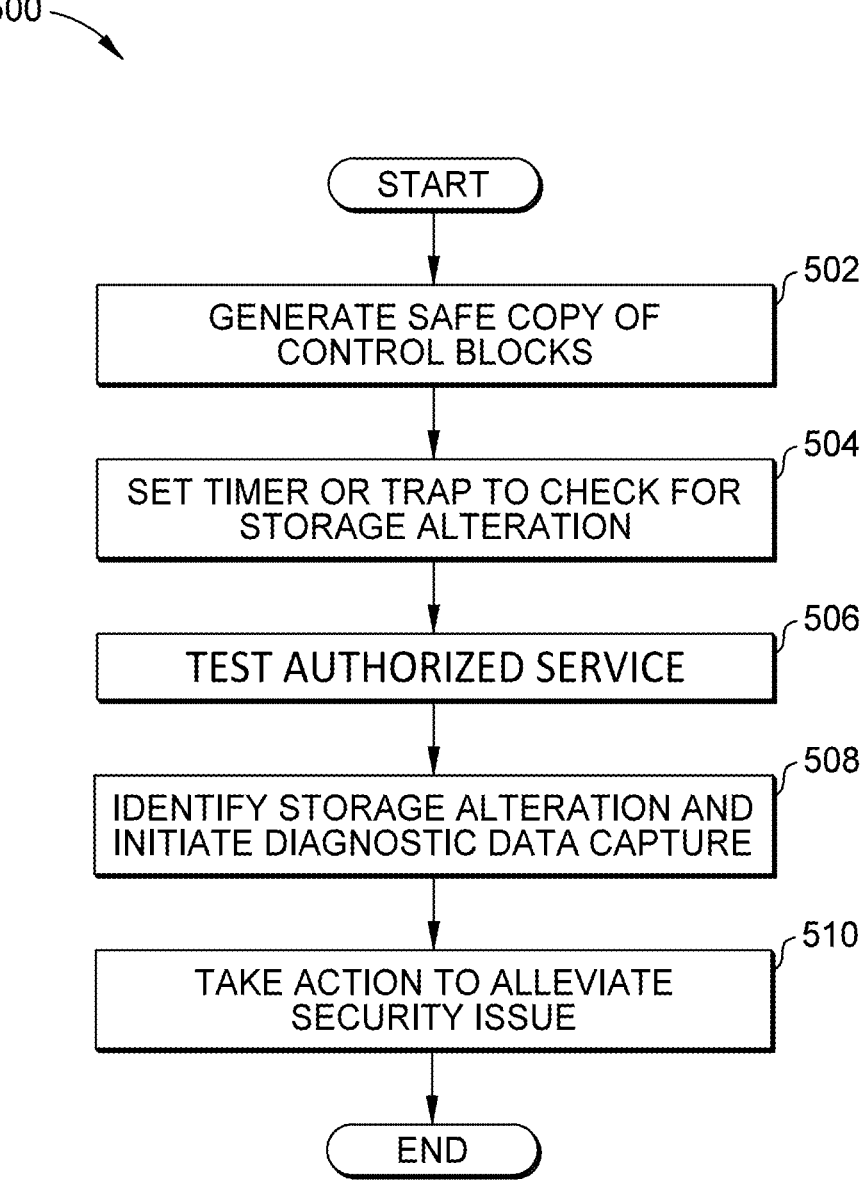
FIG. 5 illustrates a flowchart for detecting privilege escalation during operation, according to one embodiment.

FIG. 5 illustrates a flowchart 500 for detecting and isolating privilege escalation during dynamic testing, according to one embodiment. In an embodiment, as discussed above in relation to FIGS. 2-4, a detection service (e.g., the detection service 152 illustrated in FIG. 1) detects privilege escalation as part of dynamic testing, while gathering detailed information about the timing and location of the vulnerability. This is merely one example.

At block 502, the detection service generates safe copies of control blocks. For example, as discussed above in relation to FIGS. 2-3, the detection service can make a safe copy of an environment element 232, a safe copy of a system control block 242, or a safe copy of any other suitable control block. In an embodiment, the detection service saves the safe copies of the control blocks in a location unlikely to be found or modified (e.g., an address space associated with the detection service, or any other suitable location).

At block 504, the detection service sets a timer or trap to check for storage alteration. For example, the detection service can use a suitable OS macro (e.g., an STIMER macro for z/OS) to set a timer. When the timer is up, the detection service will be notified. This is merely one example, and the detection service can use any suitable technique to check for storage alteration (e.g., any suitable timer technique, a suitable interrupt technique (e.g., a SLIP TRAP in z/OS), or any other suitable technique).

At block 506, the detection service (or any other suitable software service or other technique) initiates a dynamic test of an authorized service. For example, the detection service can initiate operation of the authorized service (e.g., the authorized service 220 illustrated in FIG. 2). As another example, a human administrator, or another suitable software service, can initiate an authorized service in coordination with the detection service.

At block 508, the detection service identifies a storage alteration and initiates an alert or captures diagnostic data. In an embodiment, expiration of the timer set at block 504 (or any other suitable interrupt technique) initiates a storage alteration check by the detection service. For example, using the example illustrated in FIG. 2, the detection service can compare the safe copy of the environment element 232 to the environment element 234, and the safe copy of the system control block 242 to the system control block 244.

At block 510, the detection service takes action to alleviate the security issue. For example, as discussed above in relation to FIG. 3, the detection service can send an alert or create a report to record a potential vulnerability. These alerts or reports can be used by an automated system (e.g., a diagnostic software service) or a human administrator to identify the potential vulnerability, cure the potential vulnerability, or take any other suitable action. In an embodiment, these are merely examples and the detection service can take any suitable action or actions. Further, the detection service can restore the control blocks to baseline. For example, returning to the example of FIG. 2, the detection service can replace the environment element 234 with the safe copy of the environment element 232, and can replace the system control block 244 with the safe copy of the system control block 242.

In an embodiment, if the detection service identifies a storage alteration (e.g., indicating a potentially improper privilege escalation), the detection service initiates a diagnostic interrupt. For example, the detection service can initiate a diagnostic dump (e.g., a SLIP event in z/OS). The diagnostic dump can identify low level memory information about the state of the OS, including which instruction failed, which program failed, or both.

In an embodiment, detecting privilege escalation during operation can slow down operational performance, but can detect issues during operation. Detecting privilege escalation during operation, during testing, or at both times, can be an optional choice (e.g., by a system administrator) depending on the desired performance trade off.

While the foregoing is directed to embodiments of the present invention, other and further embodiments of the invention may be devised without departing from the basic scope thereof, and the scope thereof is determined by the claims that follow.

What is claimed is:

1. A method comprising:
generating a safe copy of a first control block for an operating system, wherein the first control block defines one or more security settings and privileges for the operating system;
recording the safe copy in memory;
initiating a test of an authorized service associated with the operating system;
identifying a vulnerability for the authorized service, comprising:
comparing a state of the first control block after the test of the authorized service with the safe copy recorded in memory; and
initiating an action to alleviate the identified vulnerability.

2. The method of claim 1, wherein identifying the vulnerability for the authorized service further comprises:
identifying a privilege escalation vulnerability based on the comparing the state of the first control block after the test of the authorized service with the safe copy recorded in memory.

3. The method of claim 2, wherein the first control block comprises a security related control block.

4. The method of claim 3, wherein the first control block comprises at least one of an accessor environment element (ACEE) block or a job step control block (JSCB).

5. The method of claim 4, wherein the first control block comprises an ACEE block, the method further comprising:
generating a second safe copy of a JSCB for the operating system; and
recording the second safe copy in memory,
wherein identifying the vulnerability for the authorized service further comprises comparing a state of the JSCB after the test of the authorized service with the second safe copy recorded in memory.

6. The method of claim 2, wherein initiating the action to alleviate the identified vulnerability comprises:
initiating at least one of: (i) an alert or (ii) generation of a report; and
restoring the first control block to baseline by, after the test, replacing the first control block with the safe copy recorded in memory.

7. The method of claim 1, further comprising:
generating a second safe copy of a second control block for the operating system;
setting a timer to check for storage alteration relating to the second control block;
initiating operation of the authorized service; and
upon expiration of the timer, identifying a second vulnerability for the authorized service based on comparing the state of the second control block with the second safe copy recorded in memory.

8. The method of claim 1, wherein recording the safe copy in memory comprises:
generating a transformed version of the first control block; and
recording the transformed version of the first control block in memory.

9. A non-transitory computer program product comprising:
one or more non-transitory computer readable media containing, in any combination, computer program code that, when executed by operation of any combination of one or more processors, performs operations comprising:

generating a safe copy of a first control block for an operating system, wherein the first control block defines one or more security settings and privileges for the operating system;

recording the safe copy in memory;

initiating a test of an authorized service associated with the operating system;

identifying a vulnerability for the authorized service, comprising:

comparing a state of the first control block after the test of the authorized service with the safe copy recorded in memory; and initiating an action to alleviate the identified vulnerability.

10. The non-transitory computer program product of claim 9, wherein identifying the vulnerability for the authorized service further comprises:

identifying a privilege escalation vulnerability based on the comparing the state of the first control block after the test of the authorized service with the safe copy recorded in memory.

11. The non-transitory computer program product of claim 10, wherein the first control block comprises a security related control block.

12. The non-transitory computer program product of claim 11, wherein the first control block comprises at least one of an accessor environment element (ACEE) block or a job step control block (JSCB).

13. The non-transitory computer program product of claim 12, wherein the first control block comprises an ACEE block, the operations further comprising:

generating a second safe copy of a JSCB for the operating system; and recording the second safe copy in memory, wherein identifying the vulnerability for the authorized service further comprises comparing a state of the JSCB after the test of the authorized service with the second safe copy recorded in memory.

14. The non-transitory computer program product of claim 10, wherein initiating the action to alleviate the identified vulnerability comprises:

initiating at least one of: (i) an alert or (ii) generation of a report; and restoring the first control block to baseline by, after the test, replacing the first control block with the safe copy recorded in memory.

15. A system, comprising:

one or more processors; and one or more memories storing a program, which, when executed on any combination of the one or more processors, performs operations, the operations comprising:

generating a safe copy of a first control block for an operating system, wherein the first control block defines one or more security settings and privileges for the operating system;

recording the safe copy in memory;

initiating a test of an authorized service associated with the operating system;

identifying a vulnerability for the authorized service, comprising:

comparing a state of the first control block after the test of the authorized service with the safe copy recorded in memory; and initiating an action to alleviate the identified vulnerability.

16. The system of claim 15, wherein identifying the vulnerability for the authorized service further comprises:

identifying a privilege escalation vulnerability based on the comparing the state of the first control block after the test of the authorized service with the safe copy recorded in memory.

17. The system of claim 16, wherein the first control block comprises a security related control block.

18. The system of claim 17, wherein the first control block comprises at least one of an accessor environment element (ACEE) block or a job step control block (JSCB).

19. The system of claim 18, wherein the first control block comprises an ACEE block, the operations further comprising:

generating a second safe copy of a JSCB for the operating system; and recording the second safe copy in memory, wherein identifying the vulnerability for the authorized service further comprises comparing a state of the JSCB after the test of the authorized service with the second safe copy recorded in memory.

20. The system of claim 16, wherein initiating the action to alleviate the identified vulnerability comprises:

initiating at least one of: (i) an alert or (ii) generation of a report; and restoring the first control block to baseline by, after the test, replacing the first control block with the safe copy recorded in memory.

* * * * *